United States Patent
Bobbin et al.

(10) Patent No.: US 7,493,570 B2
(45) Date of Patent: Feb. 17, 2009

(54) USER INTERFACE OPTIONS OF A DATA LINEAGE TOOL

(75) Inventors: Nathan Vernon Bobbin, Littleton, CO (US); Steven John Totman, Watertown, MA (US); Michael W. Yaklin, Austin, TX (US); Yasmin Youssef, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 11/224,905

(22) Filed: Sep. 12, 2005

(65) Prior Publication Data

US 2007/0061353 A1    Mar. 15, 2007

(51) Int. Cl.
    *G06F 3/048* (2006.01)
(52) U.S. Cl. .................. 715/800; 715/815; 715/818; 715/859
(58) Field of Classification Search .................. 715/798, 715/800–802, 815, 818, 820, 830, 859
    See application file for complete search history.

(56) References Cited

U.S. PATENT DOCUMENTS

| | | | |
|---|---|---|---|
| 5,671,398 A | 9/1997 | Neubauer | |
| 5,900,879 A | 5/1999 | Berry et al. | |
| 6,054,989 A | 4/2000 | Robertson et al. | |
| 6,243,093 B1 | 6/2001 | Czerwinski et al. | |
| 6,373,484 B1 | 4/2002 | Orell et al. | |
| 6,499,026 B1 | 12/2002 | Rivette et al. | |
| 6,775,659 B2 | 8/2004 | Clifton-Bligh | |
| 6,868,412 B2 | 3/2005 | Gatehouse et al. | |
| 6,944,830 B2 * | 9/2005 | Card et al. | 715/853 |
| 2003/0050915 A1 | 3/2003 | Allemang et al. | |
| 2004/0015468 A1 | 1/2004 | Beier et al. | |
| 2005/0071130 A1 | 3/2005 | Benjamin et al. | |
| 2007/0156677 A1 | 7/2007 | Szabo | |

FOREIGN PATENT DOCUMENTS

EP    0 610 581    8/1994

OTHER PUBLICATIONS aiSee Graphic Visualization Software User Manual Window Version 2.1.60, copyright Aug. 2002 and last modified Aug. 2003 (, this source is available at http://www.aisee.com/manual/windows/node54.html, the Examiner will re-number all pages of this document as pp. 1-28 for convenience.*

(Continued)

*Primary Examiner*—Weilun Lo
*Assistant Examiner*—Truc T Chuong
(74) *Attorney, Agent, or Firm*—Konrad Raynes & Victor LLP; Janaki K. Davda

(57) ABSTRACT

Provided are techniques for viewing data lineage of objects. A data lineage view that includes at least one data lineage path is displayed. The data lineage view is generated by a data lineage tool that tracks an original object through processes that touched that original object. The at least one data lineage path is generated from the original object to a selected object and indicates how the original object was affected by the processes. The data lineage view is displayed as a fish eye view.

20 Claims, 16 Drawing Sheets

OTHER PUBLICATIONS

Ascential Software, "IBM WebSphere Metastage", [online], 2005, [Retrieved on Sep. 12, 2005], retrieved from the Internet at <URL: http://www.ascential.com/products/aeip_metadata.html>.

US Patent Application filed Sep. 12, 2005, entitled "User Interface Options of a Impact Analysis Tool", invented by M.W. Yaklin.

Apple Computer, Inc., "Address Book", [online], [retrieved on Dec. 9, 2008], retrieved from the Internet at <URL: http://www.apple.com/macosx/features/addressbook/>.

Cheung, W. and C. Hsu, "The Model-Assisted Global Query System for Multiple Databases in Distributed Enterprises", ACM Transaction on Information Systems, vol. 14, No. 4, Oct. 1996, pp. 421-470.

Christodoulakis, S., M. Theodoridou, F. Ho, M. Papa, and A. Pathria, "Multimedia Document Preparation, Information Extraction, and Document Formation in MINOS: A Model and a System", ACM Transactions on Office Information Systems, vol. 4, No. 4, Oct. 1986, pp. 345-383.

Hertzum, M. and E. Frokjaer, "Browsing and Querying in Online Documentatino: A Study of User Interfaces and the Interaction Process", ACM Transactions on Computer-Human Interaction, vol. 3, No. 2, Jun. 1996, pp. 136-161.

Ivory, M.Y. and M.A. Hearst, "The State of the Art in Automating Usability Evaluation of User Interfaces", ACM Computing Surveys, vol. 33, No. 4, Dec. 2001, pp. 470-516.

U.S. Appl. No. 11/338,197, filed Jan. 23, 2006, entitled "Selection and Deselection of Objects at Multiple Levels of Hierarchy", invented by A. Swain, M.W. Yaklin, and Y. Youssef.

Darling, E., K. Recktenwald, N. Kalghattgi, & A. Burgman, "Effects of Fisheye on Visualizing Connections between Nodes", Conference on Human Factors in Computing Systems, 2005, pp. 1328-1330.

* cited by examiner

USER INTERFACE OPTIONS OF A DATA LINEAGE TOOL

BACKGROUND

1. Field

Embodiments of the invention relate to user interface options of a data lineage tool.

2. Description of the Related Art

Data lineage tools allow business and technical users to view the history of a discrete object (e.g., a object) from its introduction into, for example, a corporate data infrastructure (e.g., a database) to its current state. The history of an object may be described as information on processes that handled the object and what the processes did (e.g., a printing process printed the object). A data lineage tool may be used to answer the questions of "Where did this data come from?", "Where does this data go?" and "What business rules touch or have touched this data?" A data lineage tool accomplishes this by tracking the object through all the processes that touched (i.e., impacted or affected) that object. The output of a data lineage tool may be referred to as a data lineage view. A data lineage view includes one or more data lineage paths, and each data lineage path describes how an object was affected by processes. For example, a data lineage view may show that an object was initially stored in Database A, then was put into file B, then aggregated with information from Databases E and F, then was sent to reports Y and Z. FIG. 1 illustrates a portion of a prior art data lineage system. In this example, a data lineage tool performed a data lineage analysis on an orders.txt object 110. In FIG. 1, the data lineage from an orders.txt object to an OrderFact object and an OrderRejects.txt object is illustrated. A data lineage path may be described as a path from a first object (e.g., orders.txt) to a second object (e.g., OrderFact) that describes a lineage of the first object. A first object from which the data lineage paths start may be referred to as a parent or root and is an ancestor of all other objects in the data lineage path. The object at the end of a data lineage path is a descendent of all other objects in the data lineage path. The remaining objects (also referred to as intermediate objects) in the data lineage path are ancestors of one or more objects and descendants of one or more objects in the data lineage path.

Conventional data lineage tools are useful, but have limitations. For example, conventional data lineage tools may only show a small portion of an object's lineage, may have limited context for objects that are in an ancestry data lineage path (i.e., descendants and ancestors), and may not show how the object is affected when the object moves through the system (e.g., whether the object has been truncated, aggregated, etc.).

Thus, there is a need in the art for improved usability of a data lineage tool.

SUMMARY OF EMBODIMENTS OF THE INVENTION

Provided are a method, computer program product, and system for viewing data lineage of objects. A data lineage view that includes at least one data lineage path is displayed. The data lineage view is generated by a data lineage tool that tracks an original object through processes that touched that original object. The at least one data lineage path is generated from the original object to a selected object and indicates how the original object was affected by the processes. The data lineage view is displayed as a fish eye view.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments ease the usability of a data lineage tool by showing the full lineage of an object, by capturing how the object was affected when the object moved through a system, by providing more robust visual data lineage paths through relationships, by providing a technique for collapsing several objects into one container, and by providing several display options. Embodiments also provide context and details (e.g., metadata and/or summary information) on selected discrete objects, as well as, additional context about processes that touch the objects.

Figure 1:
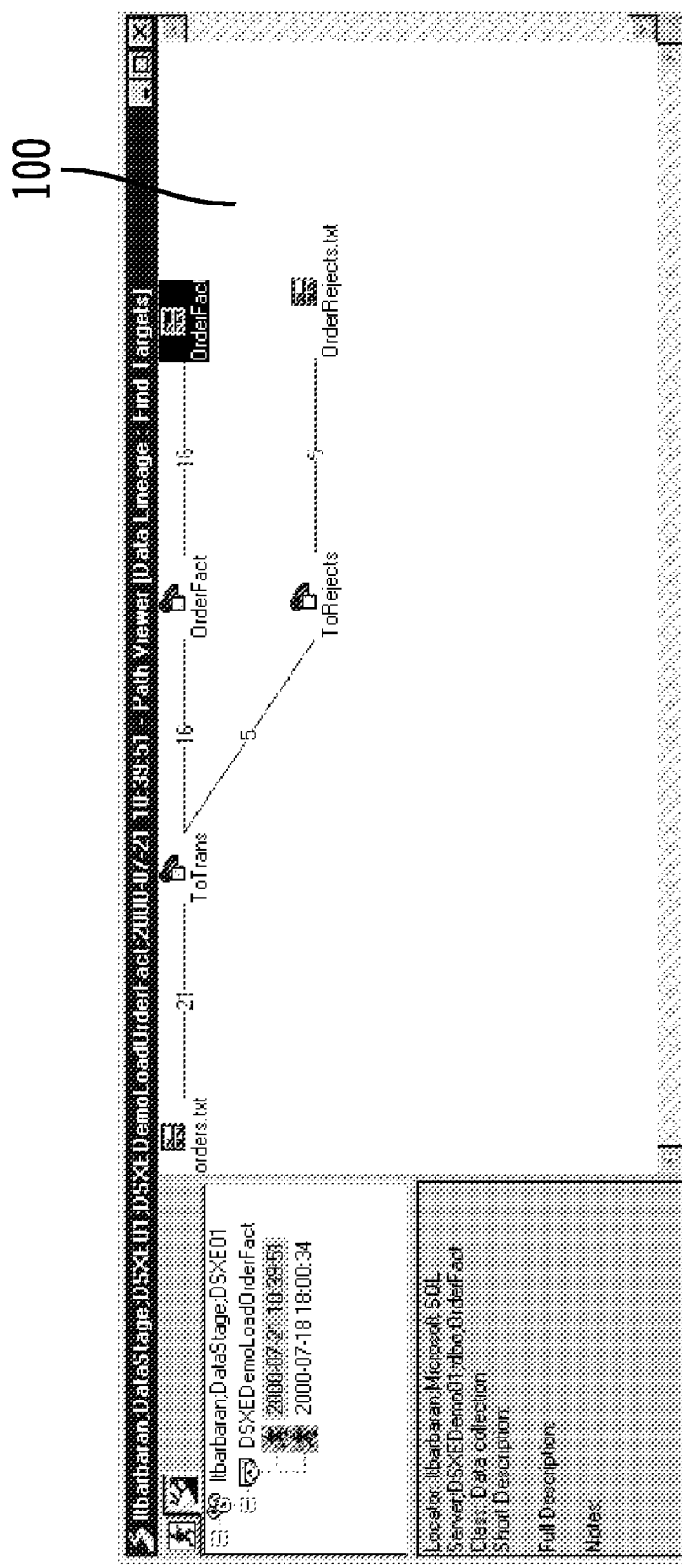
FIG. 1 illustrates a portion of a prior art display from a data lineage analysis tool.
Figure 2:
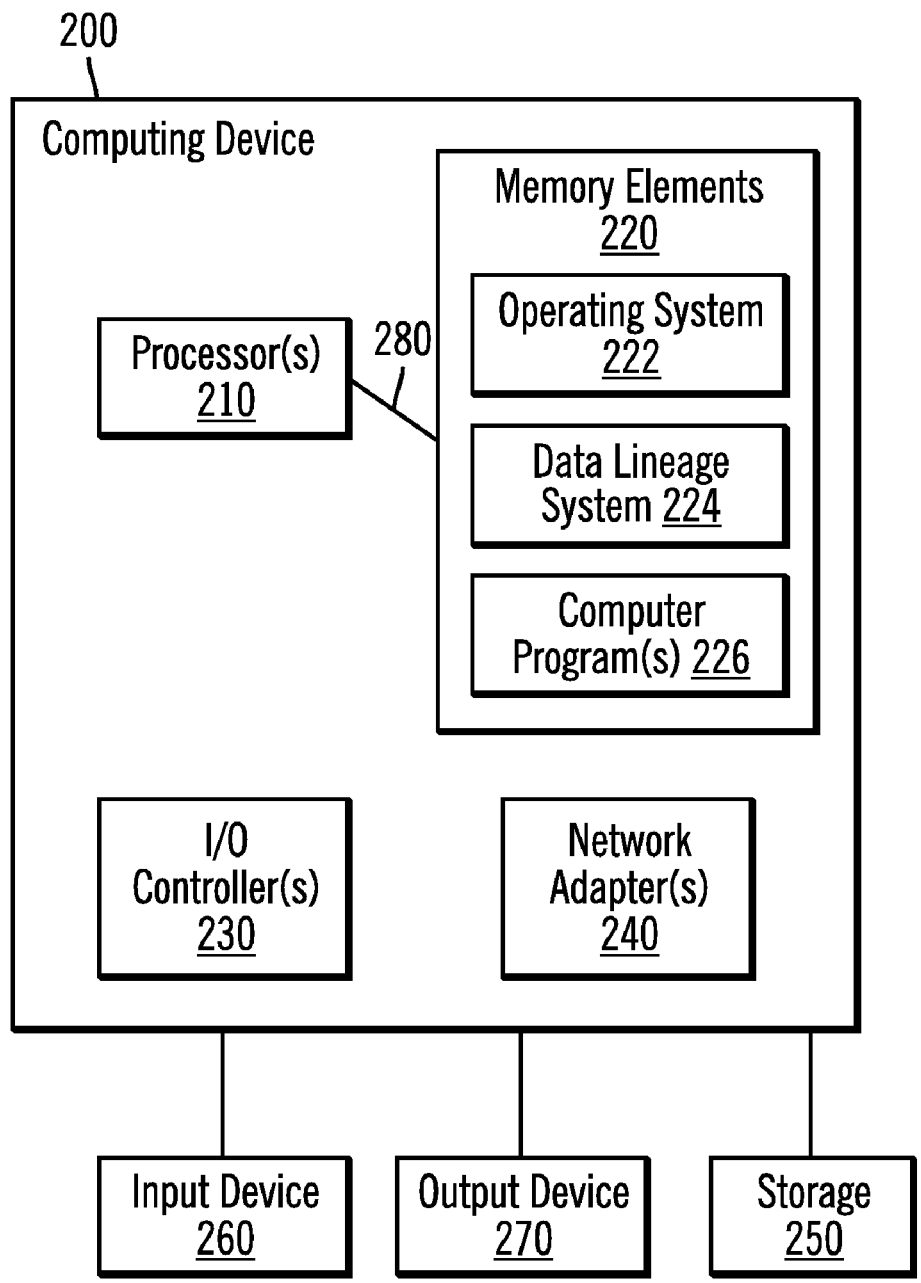
FIG. 2 illustrates details of a computing device in accordance with certain embodiments.

FIG. 2 illustrates details of a computing device 200 in accordance with certain embodiments. The computing device 200 is suitable for storing and/or executing program code and includes at least one processor 210 coupled directly or indirectly to memory elements 220 through a system bus 280. The memory elements 220 may include local memory employed during actual execution of the program code, bulk storage, and cache memories which provide temporary storage of at least some program code in order to reduce the number of times code must be retrieved from bulk storage during execution. The memory elements 220 include an operating system 222, a data lineage system 224, and one or more other computer programs 226.

Input/output or I/O devices 260, 270 (including but not limited to keyboards, displays, pointing devices, etc.) may be coupled to the system either directly or through intervening I/O controllers 230.

Network adapters 240 may also be coupled to the system to enable the data processing system to become coupled to other data processing systems or remote printers or storage devices through intervening private or public networks. Modems, cable modem and Ethernet cards are just a few of the currently available types of network adapters 240.

The computing device 200 may be coupled to storage 250 (e.g., a non-volatile storage area, such as magnetic disk drives, optical disk drives, a tape drive, etc.). The storage 230 may comprise an internal storage device or an attached or network accessible storage. Computer programs 226 in storage 230 may be loaded into the memory elements 220 and executed by a processor 210 in a manner known in the art. In certain embodiments, the storage 250 stores a database. The data lineage system 224 may store and retrieve data (e.g., lineage data for an object) from the database.

The computing device 200 may include fewer components than illustrated, additional components not illustrated herein, or some combination of the components illustrated and additional components. The computing device 200 may comprise any computing device known in the art, such as a mainframe, server, personal computer, workstation, laptop, handheld computer, telephony device, network appliance, virtualization device, storage controller, etc.

In certain embodiments, the data lineage system 224 includes a collection of tools for investigating and analyzing data lineage paths between objects. The data lineage system 224 provides a User Interface (UI) that continually and dynamically adjusts the visual presentation of objects in a data lineage view to modify data lineage paths between user-selected objects and offers a number of user-controlled options for compressing the visual presentation of intermediate objects in a data lineage path. The user interface of the data lineage system 224 also permits user drill down on objects and relationships in a displayed data lineage path.

FIGS. 3A, 3B, 3C, and 3D illustrate logic performed by the data lineage system 224 in accordance with certain embodiments. Control begins at block 300 with the data lineage system 224 receiving user input. In block 302, the data lineage system 224 determines whether the user input has selected an object for data lineage analysis. If so, processing continues to block 304, otherwise, processing continues to block 306. In block 304, the data lineage system 224 performs data lineage analysis and displays a data lineage output that includes a data lineage view. From block 304, processing returns to block 300. The data lineage view may be described as a portion of the output of the data lineage analysis. In particular, a user identifies a discrete object of which the user would like to see the lineage, and the data lineage system 224 presents the user with a list of objects that are part of the original object's history. In certain embodiments, the history for an object may be stored in a database and indicates the processes that impacted or affected that object and how the object was impacted or affected. The user may select one or more of the objects in the list of objects, and the data lineage system 224 displays a data lineage path from the original object to each of the other selected objects. The data lineage system 224 also displays details of the original object and a selected object in a displayed data lineage path.

Figure 4:
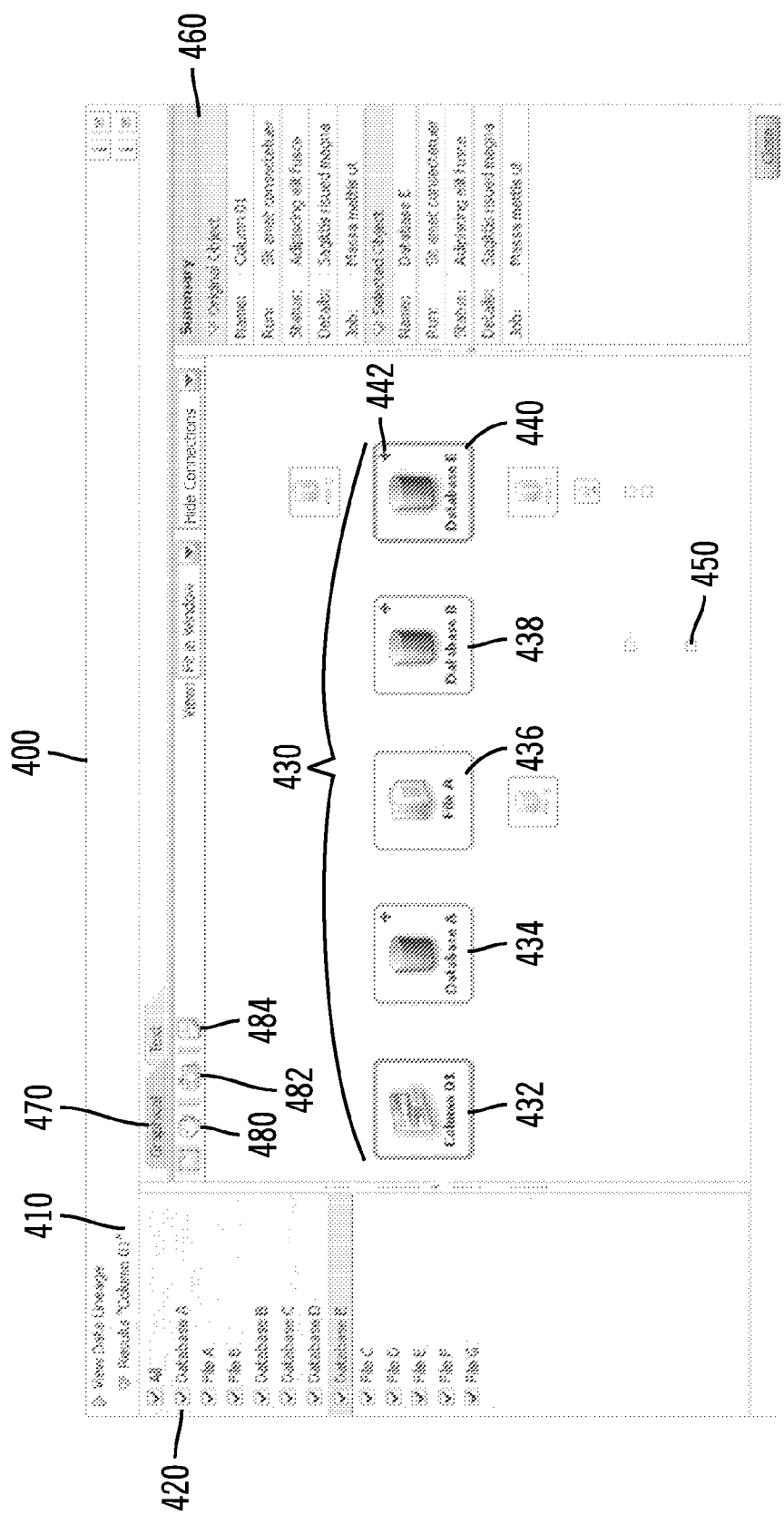
FIG. 4 illustrates a data lineage analysis output in accordance with certain embodiments.

FIG. 4 illustrates data lineage output 400 in accordance with certain embodiments. In FIG. 4, data lineage analysis was run on a Column 01 object (as represented by text 410) that was selected by a user. The data lineage output 400 includes a list of objects 420, a path area 424, and a details area 460 (labeled "Summary" in this example). The data lineage view 426 is displayed as a fish eye view within the path area 424. The data lineage system 224 presents the user with a list of objects 420 that are part of the original object's history in a pane of the data lineage output 400. The user has selected all of the objects in the list of objects 420 (shown by the checkmarks in the checkboxes by the objects). Therefore, the data lineage view 426 includes data lineage paths from Column 01 to each of the selected objects. In addition, the user has selected a Database E object 422 in this example (shown by highlighting Database E object 422 in the list of objects and by highlighting Database E 440 in the data lineage path 430), and the data lineage system 224 displays the data lineage path 430 from the Column 01 object 410 to the Database E object 422 with larger graphics (e.g., icons) than the other displayed objects (e.g., object 450). In this example, the data lineage path 430 is displayed in iconic form in the center pane. The data lineage path 430 indicates that Column 01 432 was stored in Database A 434 in File A 436, which was copied to Database B 438 and then copied into Database E 440. The data lineage system 224 also provides a details area 460 which is capable of providing details (i.e., information) about objects that are displayed in the data lineage view 426 (e.g., of the Column 01 object 410 and the Database E object 422 (which is selected in data lineage path 430). In certain embodiments, the data lineage system 224 displays the data lineage view as a collection of objects and their relationships, while details of a selected object are displayed in another area of the data lineage output. In certain other embodiments, the data lineage system 224 displays the data lineage view as a textual view in a center area in text format that describes a collection of objects and relationships.

Returning to FIG. 3A, in block 306, the data lineage system 224 determines whether the user input indicates that a graphical view has been selected. In particular, the data lineage system 224 provides both a graphical view and a text view. In a graphical view, objects are represented with graphics (e.g., icons). If so, processing continues to block 308, otherwise, processing continues to block 310. In block 308, the data lineage system 224 displays a graphical view of the data lineage view. For example, in FIG. 4, the graphical view tab 470 provided by the data lineage system 224 has been selected. From block 308, processing returns to block 300.

Figure 10:
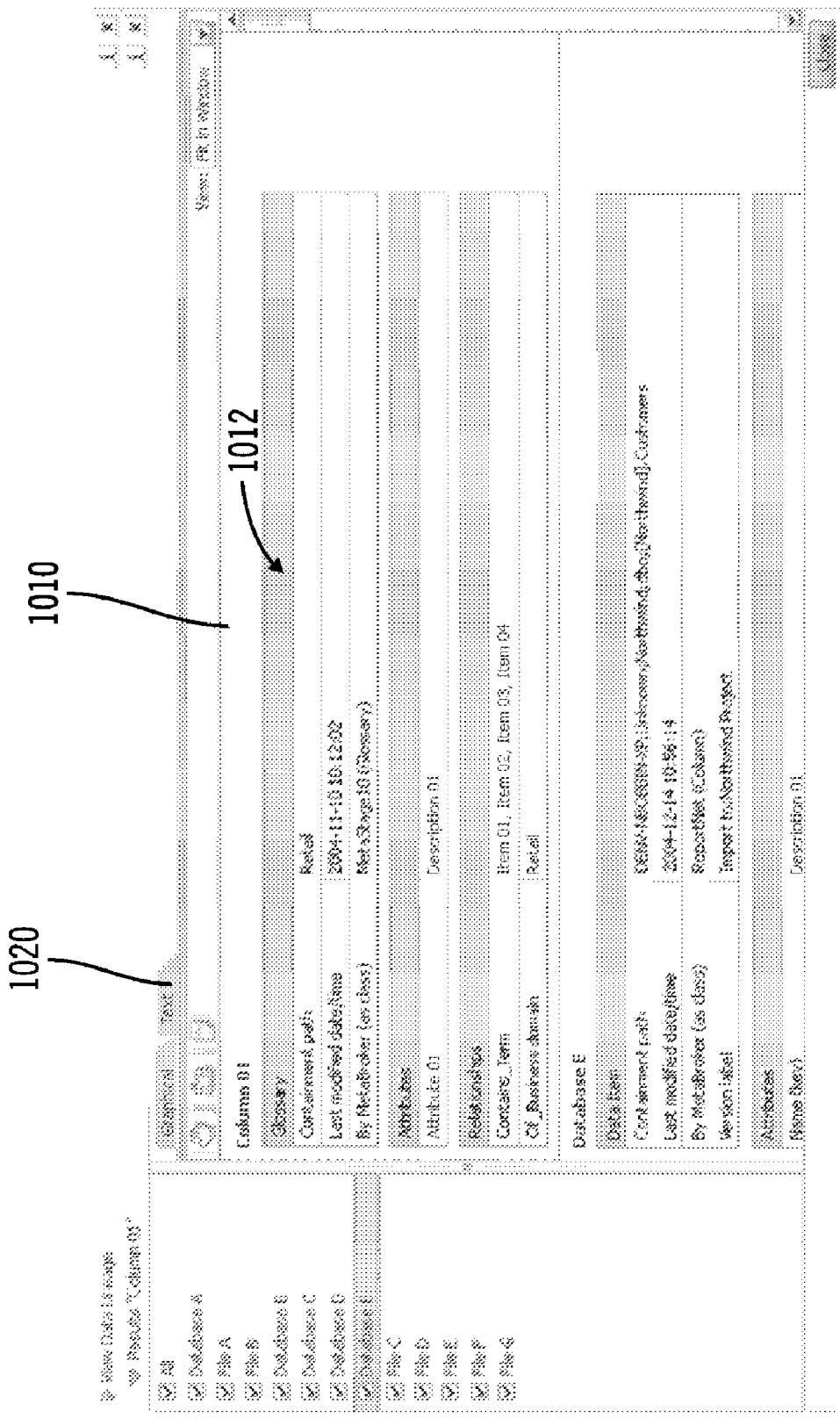
FIG. 10 illustrates a text view in accordance with certain embodiments.

In block 310, the data lineage system 224 determines whether the user input indicates that a text view has been selected. If so, processing continues to block 312, otherwise, processing continues to block 314. In block 312, the data lineage system 224 displays a text view of the data lineage view. From block 312, processing returns to block 300. FIG. 10 illustrates a text view in accordance with certain embodiments. In FIG. 10, the text view tab 1010 provided by the data lineage system 224 has been selected. The data lineage view 1012 displayed in path area 1010 provides a textual description of the data lineage path from the original Column 01 object and the selected Database E object.

In block 314, the data lineage system 224 determines whether the user input indicates that a grab tool has been selected. If so, processing continues to block 316, otherwise, processing continues to block 318. In block 316, the data lineage system 224 updates the data lineage view to show a portion of the data lineage view based on the user input. From block 316, processing returns to block 300. In FIG. 4, the grab tool provided by the data lineage system 224 is represented by a hand 480. In certain embodiments, the data lineage system 224 implements the functionality of the grab tool by enabling a user to hold down a spacebar of a keyboard and click and drag (e.g., with an input device, such as a mouse) the background to various positions. In certain embodiments, the functionality of the grab tool may be implemented using arrow keys on the keyboard. In these manners, the user may quickly move the displayed view without the use of a scrollbar.

In block 318, the data lineage system 224 determines whether the user input indicates that a snapshot tool has been selected. If so, processing continues to block 320, otherwise, processing continues to block 322. In block 320, the data lineage system 224 generates a snapshot of the displayed view. From block 320, processing returns to block 300. In FIG. 4, the snapshot tool provided by the data lineage system 224 is represented by a camera 482. In certain embodiments, the snapshot is stored in a document that may later be exported to multiple formats (e.g., Portable Document Format (PDF) format, Joint Photographic Experts Group (JPEG) format, word processing document format, etc.). In certain embodiments, the snapshot is stored in a report generated by the generate report tool.

Figure 3A:
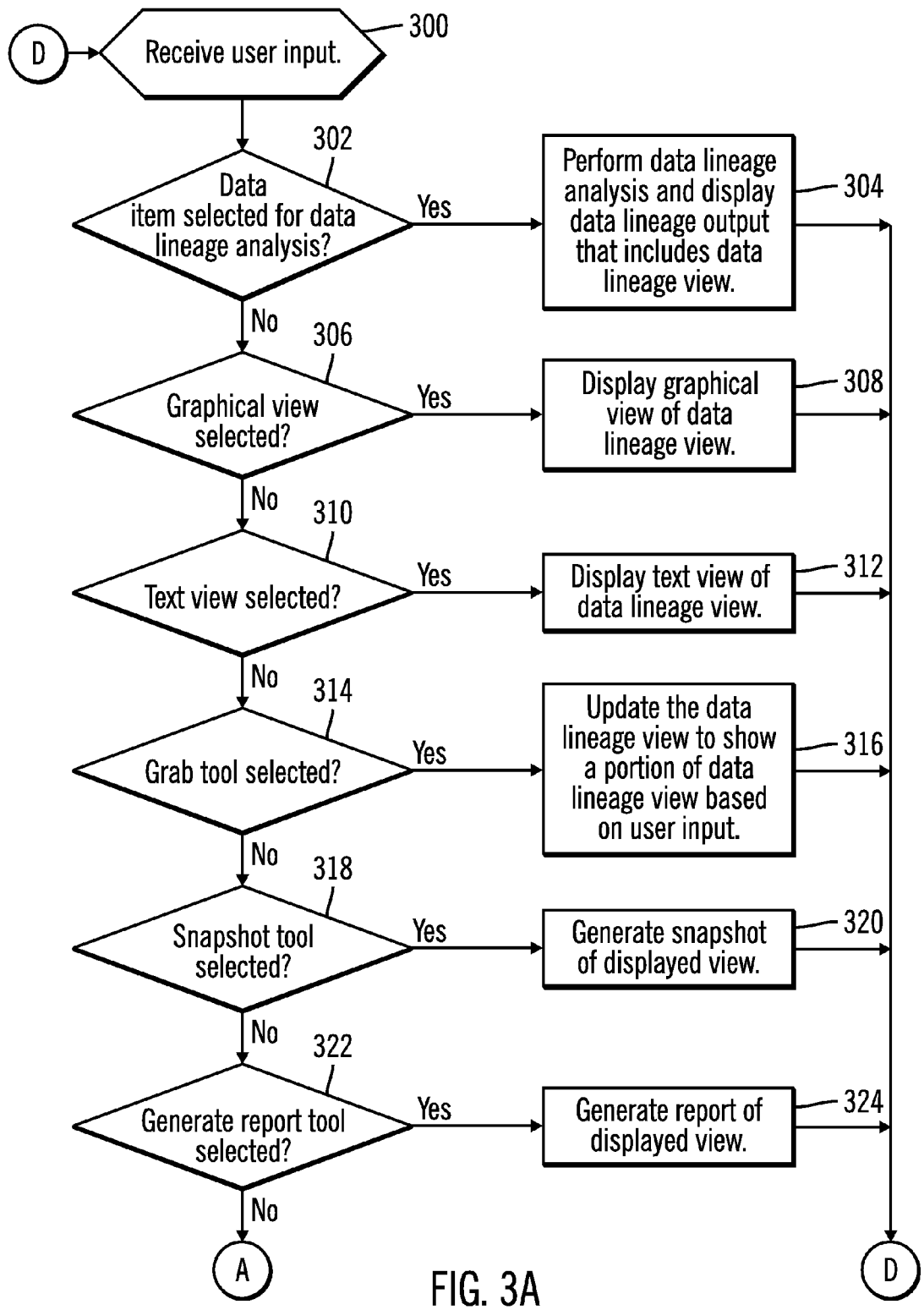
FIGS. 3A, 3B, 3C, and 3D illustrate logic performed by the data lineage system in accordance with certain embodiments.
Figure 3B:
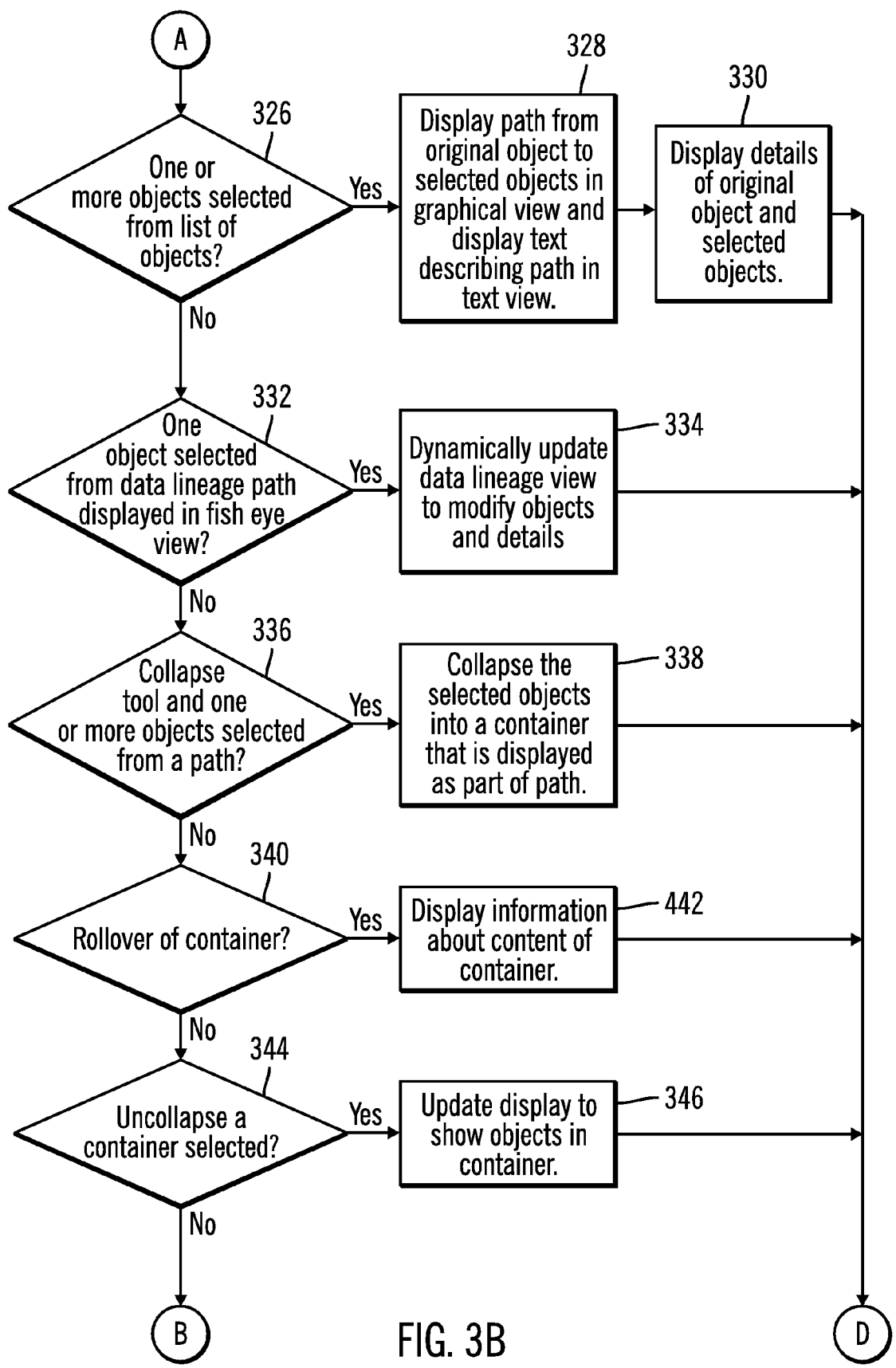

In block 322, the data lineage system 224 determines whether the user input indicates that a generate report tool has been selected. If so, processing continues to block 324, otherwise, processing continues to block 326 (FIG. 3B). In block 324, the data lineage system 224 generates a report of the displayed view. From block 324, processing returns to block 300. In FIG. 4, the generate report tool provided by the data lineage system 224 is represented by a document 484. In certain embodiments, the report may be generated in various formats (e.g., PDF format, JPEG format, word processing document format, etc.) and may include one or more snapshots. For example, in text view, the user may create a text-based document of the objects that they are interested in and quickly export or print the text-based document for reporting purposes.

In block 326 (FIG. 3B), the data lineage system 224 determines whether the user input indicates that one or more objects have been selected from a list of objects. In FIG. 4, the user has selected all of the objects in the list of objects 420 (shown by the checkmarks in the checkboxes by the objects). Therefore, the data lineage view 426 includes data lineage paths from Column 01 to each of the selected objects. If so, processing continues to block 328, otherwise, processing continues to block 332. In block 328, the data lineage system 224 displays a data lineage path from an original object (i.e., the object for which data lineage analysis was performed) to each selected object in a graphical view and displays text describing each data lineage path in the text view. In block 330, the data lineage system 224 also displays details of the original object and a selected object. In FIG. 4, Database E 440 is selected in data lineage path 430, and details 460 of the original object Column 01 410 and the selected object Database E 422 are displayed. From block 330, processing continues to block 300. In this manner, by selecting one or more objects in the list of objects, users may view a data lineage path from the original object to each selected object.

In block 332, the data lineage system 224 determines whether the user input indicates that one object has been selected from a data lineage path displayed in a fish eye view. In certain embodiments, the selection may be made by highlighting an object in a list of objects (e.g., the Database E object 422 is highlighted in FIG. 4). In certain embodiments, the selection may be made by using an input device to click on an object (e.g., Database E 440) in the data lineage path. If so, processing continues to block 334, otherwise, processing continues to block 336. In block 334, the data lineage system 224 dynamically updates the data lineage view to modify objects and details. For example, the selected object may be made larger than other objects (also referred to as unselected objects), illustrated with different colors or highlighting to distinguish from unselected objects or may be represented with a different graphic (e.g., a circle rather than a square), while the unselected objects (which may include the original object) may be made smaller than the selected object, may have different colors and no highlighting to distinguish from the selected object, and may be represented with a different graphic. In certain embodiments, the unselected objects do not include the original object and the size of the selected object is a same size as a size of the original object. Also, if multiple data lineage paths are illustrated and an object has been selected in a first data lineage path, if an object in a second data lineage path is selected, the data lineage system 224 may align the original object and the selected object (e.g., align horizontally). Also, the data lineage system 224 modifies the details to provide details of the newly selected object. From block 334, processing continues to block 300.

Figure 5:
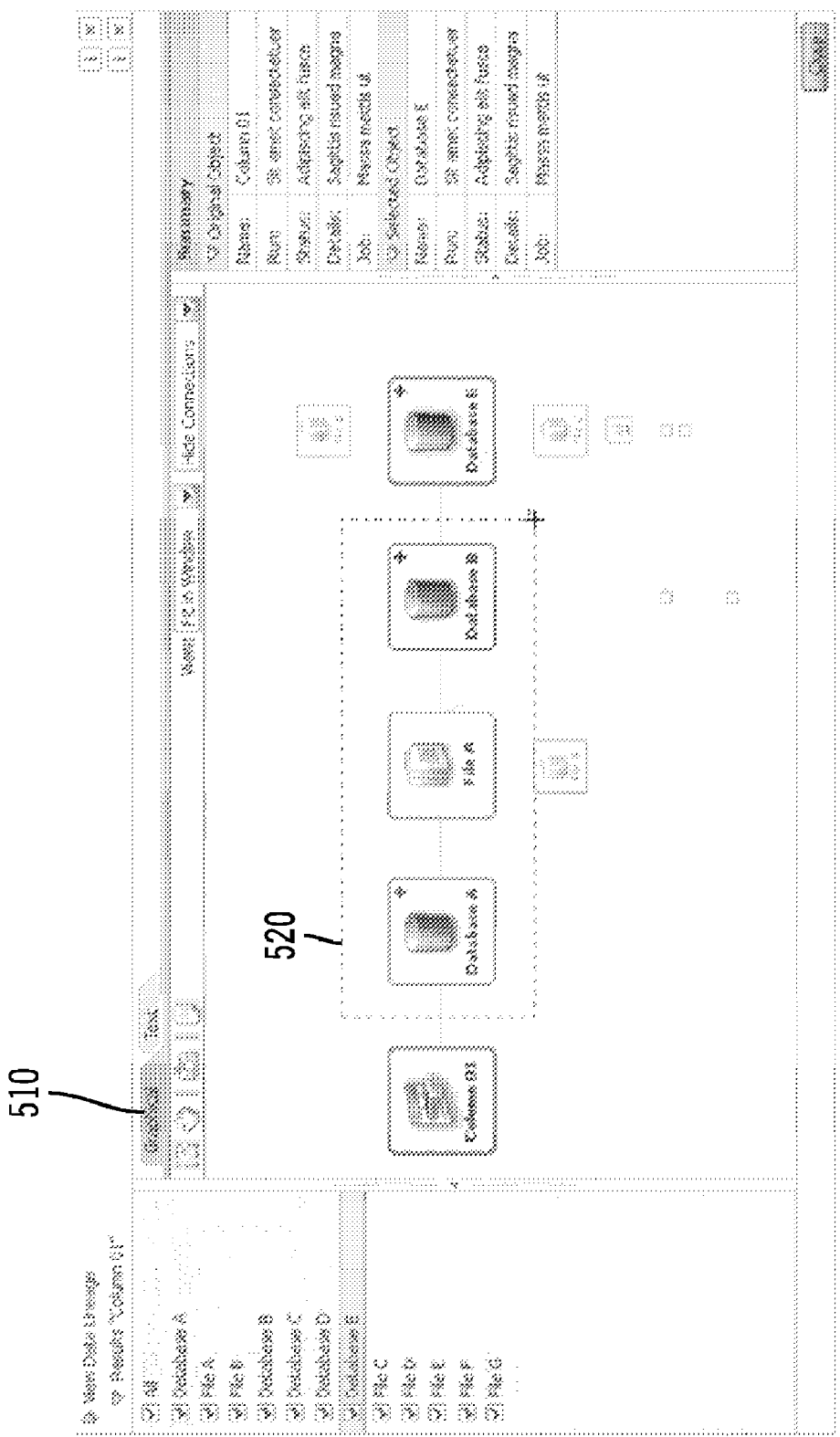
FIG. 5 illustrates a container in accordance with certain embodiments.
Figure 6:
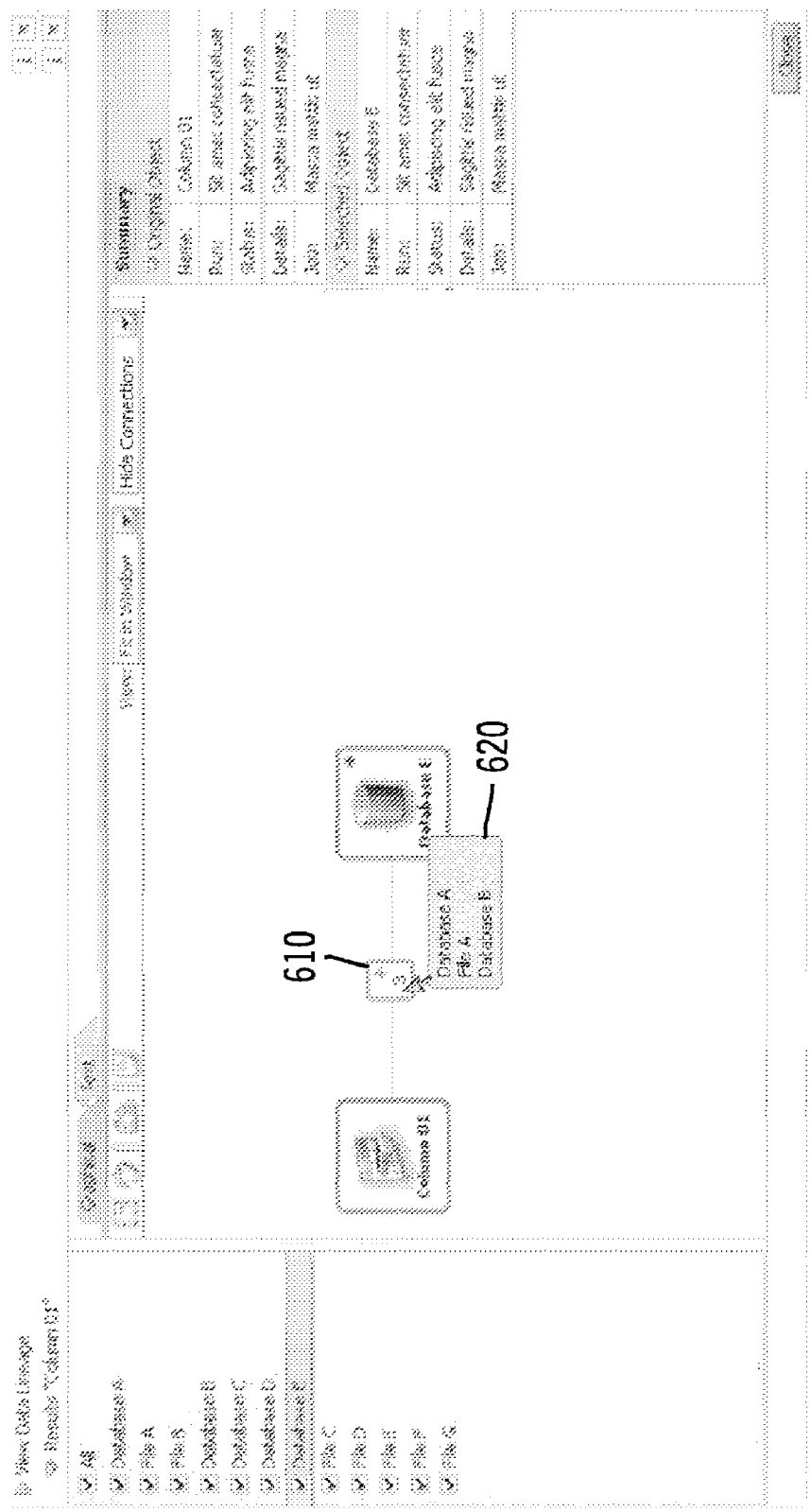
FIG. 6 illustrates a container that includes collapsed objects in accordance with certain embodiments.

In block 336, the data lineage system 224 determines whether the user input indicates that a collapse tool and one or more objects have been selected from a data lineage path. If so, processing continues to block 338, otherwise, processing continues to block 340. In block 338, the data lineage system 224 collapses the selected objects into a container that is displayed as part of the data lineage path. From block 338, processing continues to block 300. FIG. 5 illustrates collapse of objects in accordance with certain embodiments. A collapse tool 510 provided by the data lineage system 224 may be selected and used to draw a rectangle 520 around objects to be collapsed. FIG. 6 illustrates a container 610 that includes collapsed objects in accordance with certain embodiments. In FIG. 6, the objects that were collapsed in FIG. 5 are shown as a container 610 with a plus (+) symbol. The plus symbol may also be referred to as an uncollapse symbol. Thus, the collapse tool allows the user to select a set of objects and collapse them into a small container, thereby making additional room for objects that are important to the user.

In block 340, the data lineage system 224 determines whether the user input indicates that an input device has been used to rollover a container. If so, processing continues to block 342, otherwise, processing continues to block 346. In block 342, the data lineage system 224 displays information about the content of the container (e.g., a tool tip that lists the objects in the container). From block 342, processing continues to block 300. For example, in FIG. 6, user input rolled over the container 610, and the data lineage system 224 displayed a tool tip 620 that lists the objects in container 610.

Figure 3C:
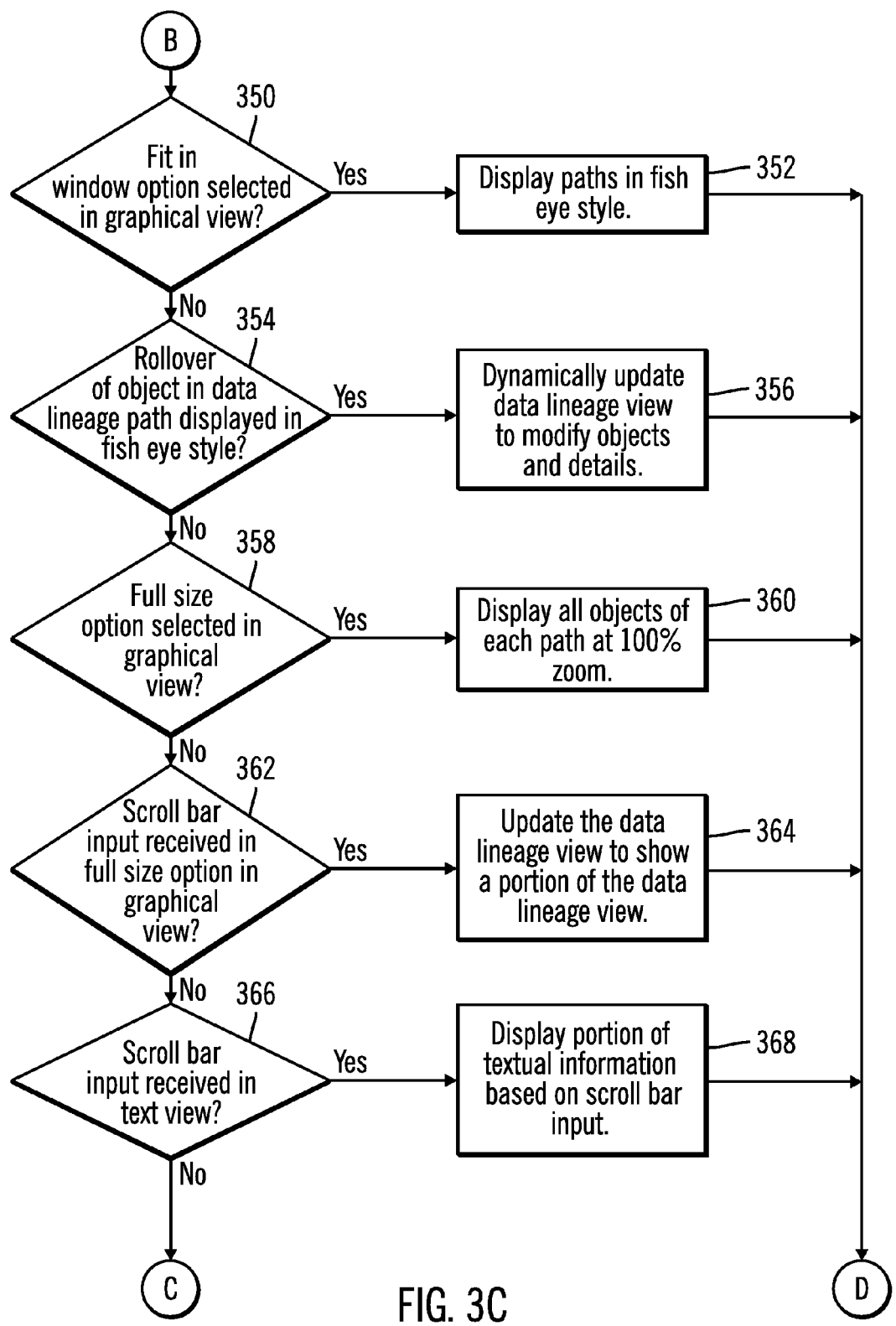
Figure 7:
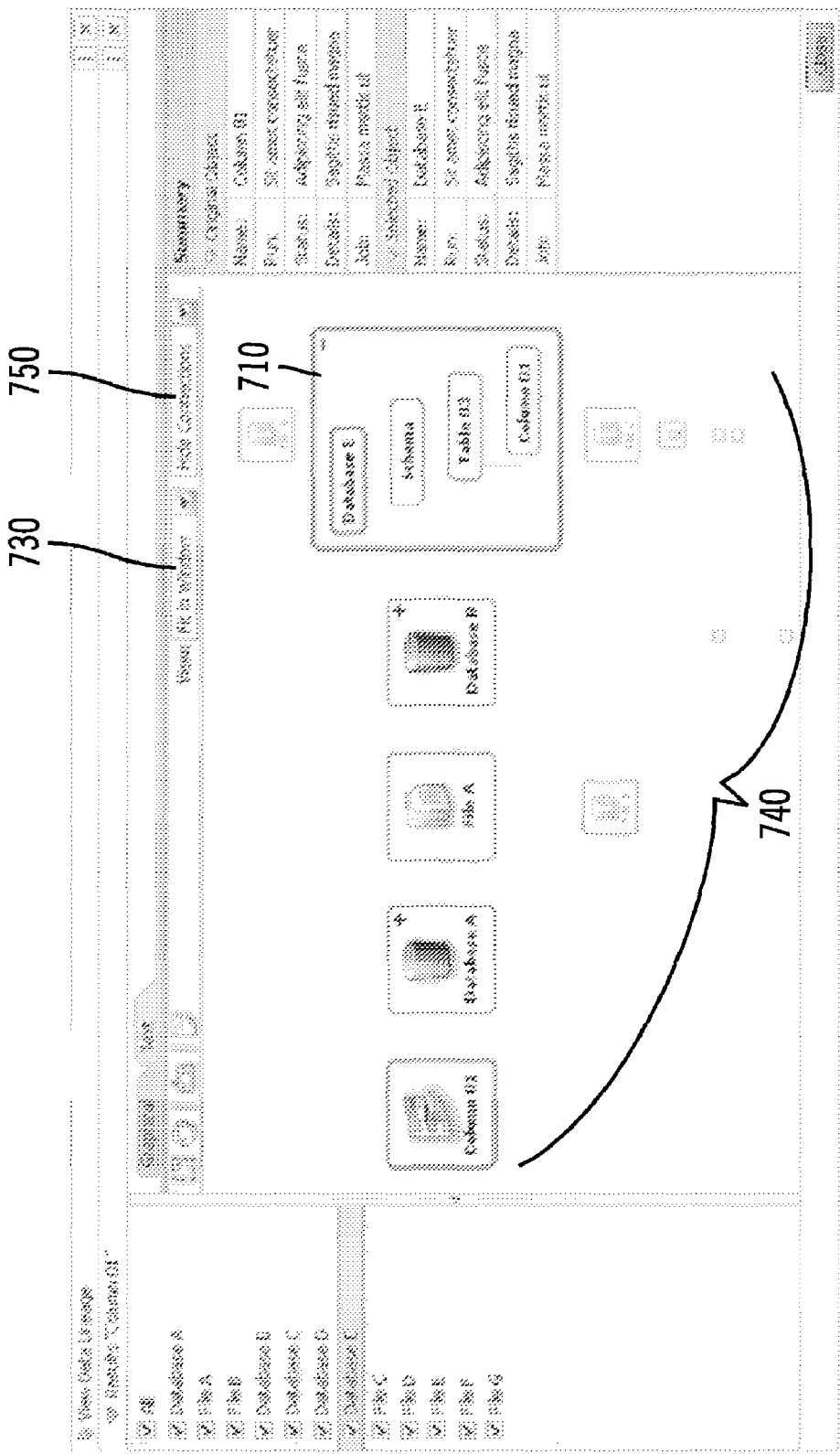
FIG. 7 illustrates uncollapsed objects in accordance with certain embodiments.

In block 344, the data lineage system 224 determines whether the user input indicates that a container is to be uncollapsed. In certain embodiments this user input is selection of an uncollapse symbol (e.g., a double click on the plus symbol of a container). If so, processing continues to block 346, otherwise, processing continues to block 350 (FIG. 3C). In block 346, the data lineage system 224 displays the items in the container. From block 342, processing continues to block 300. FIG. 7 illustrates uncollapsed objects in accordance with certain embodiments. In particular, in FIG. 4, the Database E 440 is a container with a plus symbol. In response to a user selecting the plus symbol 442 of Database E 440, the data lineage system 224 displays the contained objects 710 in FIG. 7, along with a minus symbol ("−") to indicate that the container has been uncollapsed. Selecting the minus symbol recollapses the container. Thus, the data lineage system 224 allows the user to select a set of objects and collapse them into a container, thereby making additional room for the objects that are important to the user. Rolling over the collapsed container brings up information about the content of the container. Double clicking or opening the plus symbol expands the collapsed container.

In block 350 (FIG. 3C), the data lineage system 224 determines whether the user input has selected a "Fit in window" option in a graphical view. If so, processing continues to block 352, otherwise, processing continues to block 354. In block 352, the data lineage system 224 displays data lineage paths in a fish eye view. A fish eye view may be described as display of a connected series of objects in which objects gain visual prominence as they are selected and/or rolled over. From block 352, processing continues to block 300. In FIG. 7, the "Fit in window" option 730 provided by the data lineage system 224 has been selected and objects in data lineage paths 740 are displayed in a fish eye view. Thus, with the "Fit in window" option, the data lineage system 224 displays data lineage paths as a fish eye view to allow all of the objects to fit on the visible computer screen, which avoids the need for a user to use a scrollbar to access portions that otherwise could not be displayed on the visible computer screen. Upon rollover, the data lineage system 224 enables objects in the background to zoom into focus (i.e., has characteristics to enable the rolled over object to be viewed easily with, for example, a larger sized graphic than the graphics of other objects,) and allows the user to quickly scan through all objects.

Figure 11A:
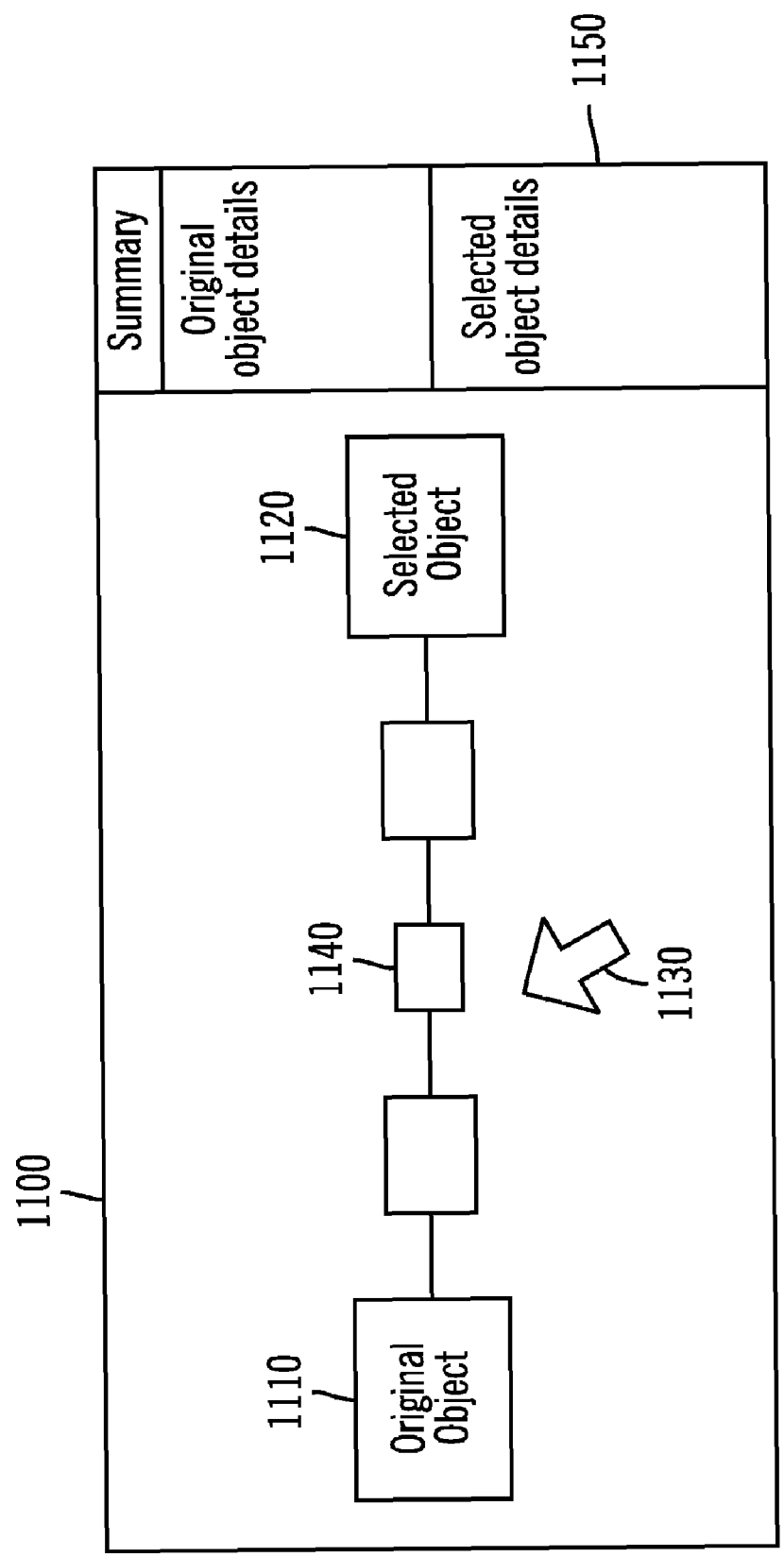
FIGS. 11A, 11B, and 11C illustrate an object being rolled over in accordance with certain embodiments.
Figure 11B:
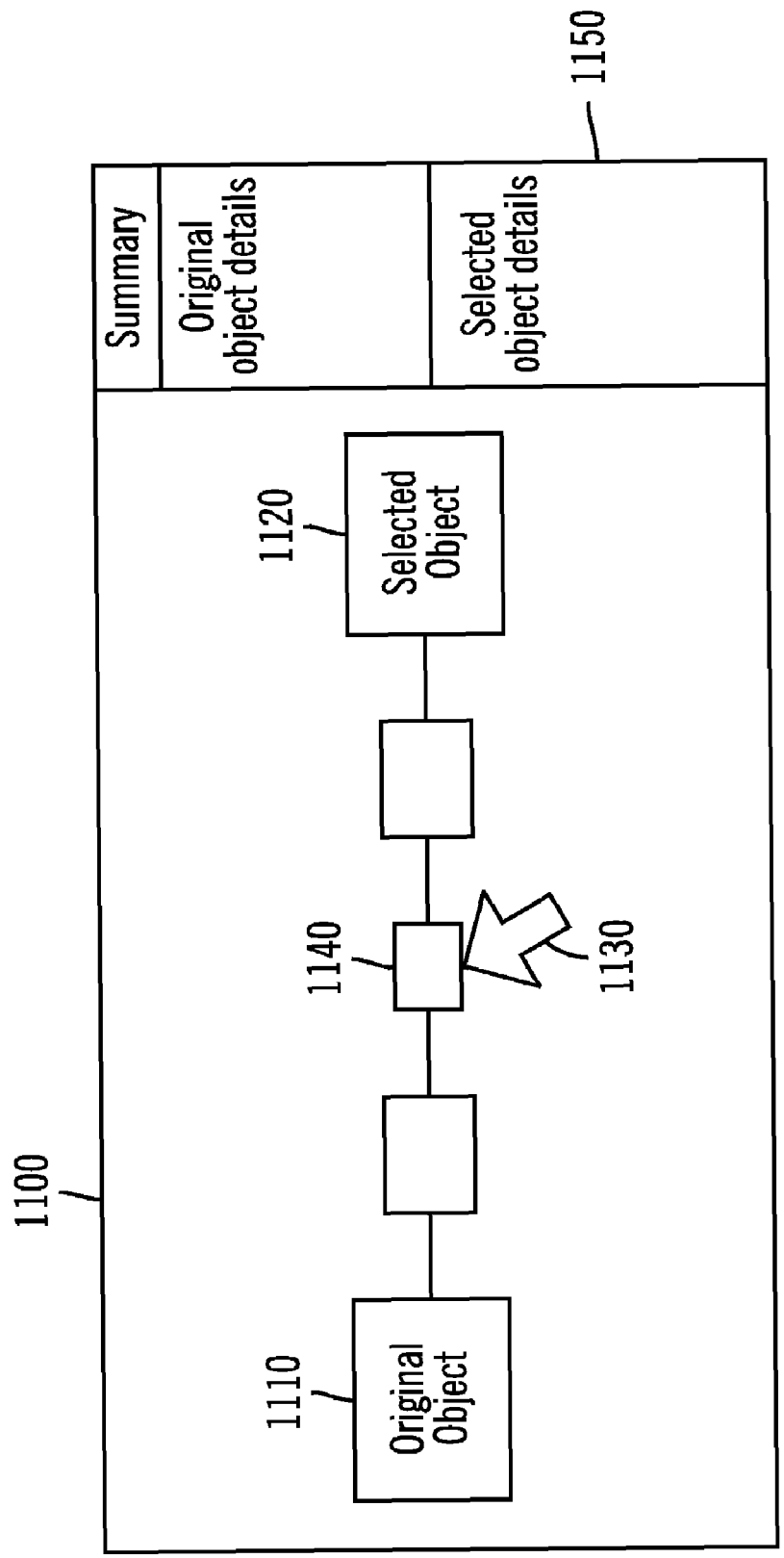
Figure 11C:
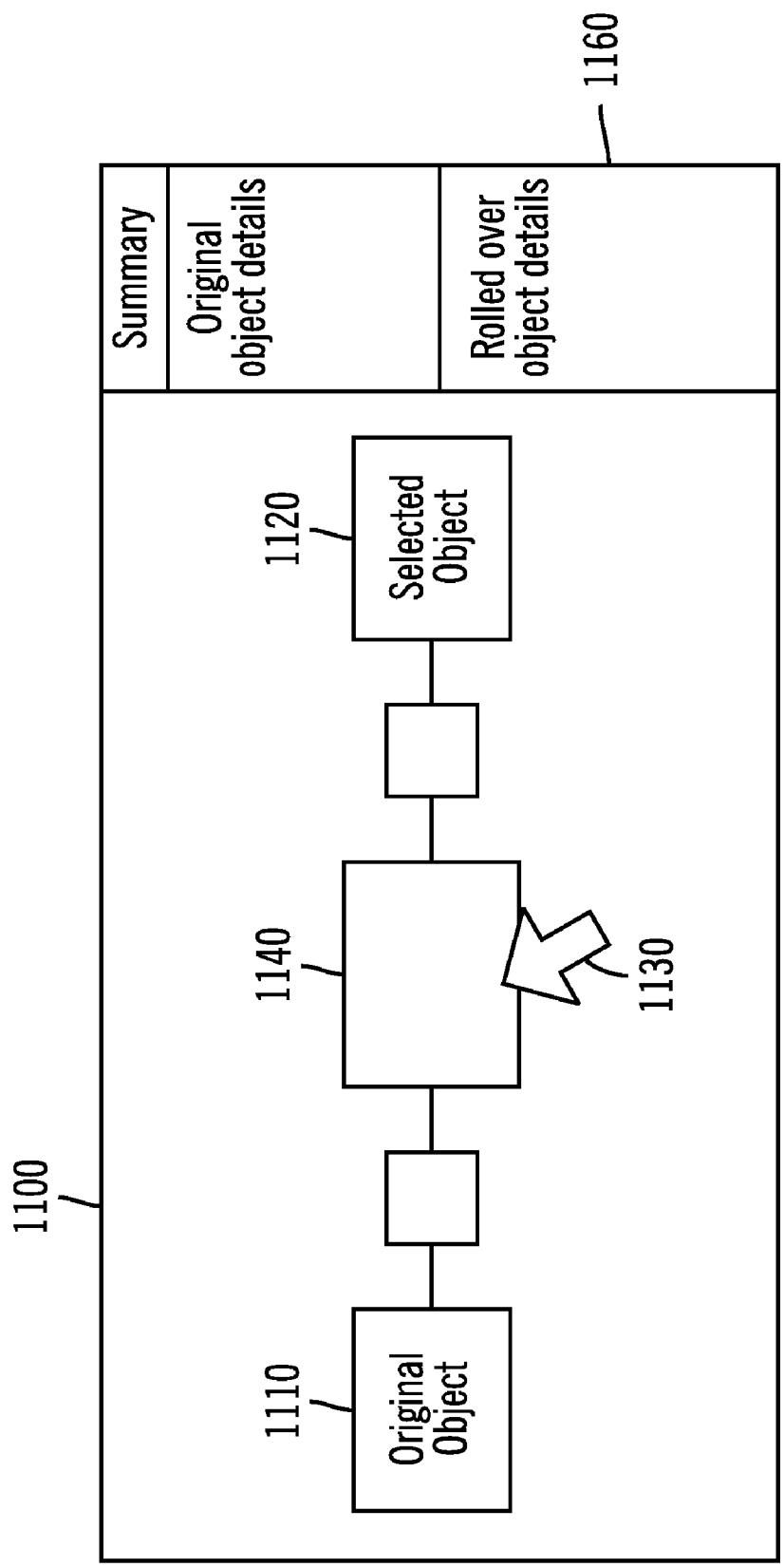

In block 354, the data lineage system 224 determines whether the user input has indicated that an input device has been used to roll over an object displayed in a fish eye view. In certain embodiments, rolling over an object may be described as using an input device to move a cursor over the object. If so, processing continues to block 356, otherwise, processing continues to block 358. In block 356, the data lineage system 224 dynamically updates the data lineage view to modify objects and details. For example, the rolled over object may be made larger than other objects (including a selected object, unselected objects, and the original object), illustrated with different colors or highlighting to distinguish from other objects or may be represented with a different graphic (e.g., a circle rather than a square), while the other objects may be made smaller than the rolled over object, may have different colors and no highlighting to distinguish from the rolled over object, and may be represented with a different graphic. In certain embodiments, the other objects do not include the original object and the size of the rolled over object is a same size as a size of the original object. Also, the data lineage system 224 modifies the details to provide details of the rolled over object. From block 356, processing continues to block 300. FIGS. 11A, 11B, and 11C illustrate an object being rolled over in accordance with certain embodiments. FIG. 11A illustrates a data lineage view 1100. A data lineage path 1102 includes an original object 1110 and a selected object 1120. The objects between the original object and the selected object may be referred to as intermediate objects. A cursor 1130 is near an intermediate object 1140. Details 1150 of the selected object are displayed. In a fish eye view, as can be seen in FIG. 11A, the visual presentation of the intermediate objects is compressed by reducing a size of the intermediate objects. In FIG. 11B, the cursor 1130 is shown over the intermediate object 1140. The display of cursor 1130 in FIGS. 11A and 11B is intended to depict a rollover motion over intermediate object 1140. FIG. 11C illustrates the results of the rollover. In particular, intermediate object 1140 is now displayed larger than other intermediate objects and details 1160 of the intermediate object are displayed.

Figure 8:
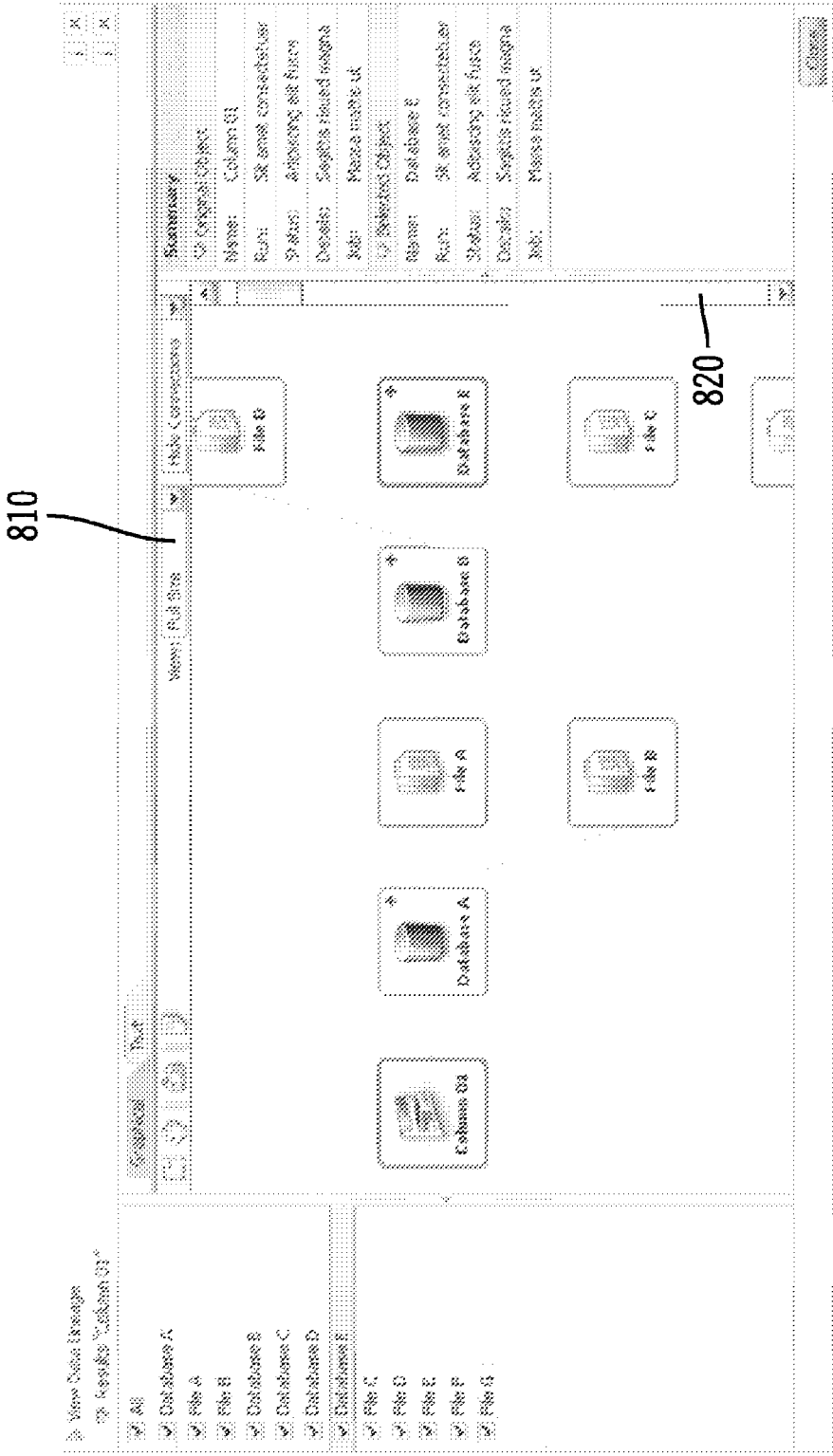
FIG. 8 illustrates a "Full size" option view in accordance with certain embodiments.

In block 358, the data lineage system 224 determines whether the user input has selected a "Full size" option in a graphical view. If so, processing continues to block 360, otherwise, processing continues to block 362. In block 360, the data lineage system 224 displays all objects of each data lineage path at one hundred percent (100%) actual zoom (i.e., at actual size). From block 360, processing continues to block 300. FIG. 8 illustrates a "Full size" option view in accordance with certain embodiments. In FIG. 8, the "Full size" option 810 provided by the data lineage system 224 has been selected and all objects in the data lineage paths are displayed as part of a data lineage view, but not all portions of the view are visible on the computer screen. A scrollbar 820 may be used to view objects that are not displayed on the visible computer screen.

In block 362, the data lineage system 224 determines whether the user input has indicated that scroll bar input (i.e., input received when a scroll bar was moved by a user) has been received when the "Full size" option has been selected. If so, processing continues to block 364, otherwise, processing continues to block 366. In block 364, the data lineage system 224 updates the data lineage view to show a portion of the data lineage view based on the scroll bar input. From block 364, processing continues to block 300.

Figure 3D:
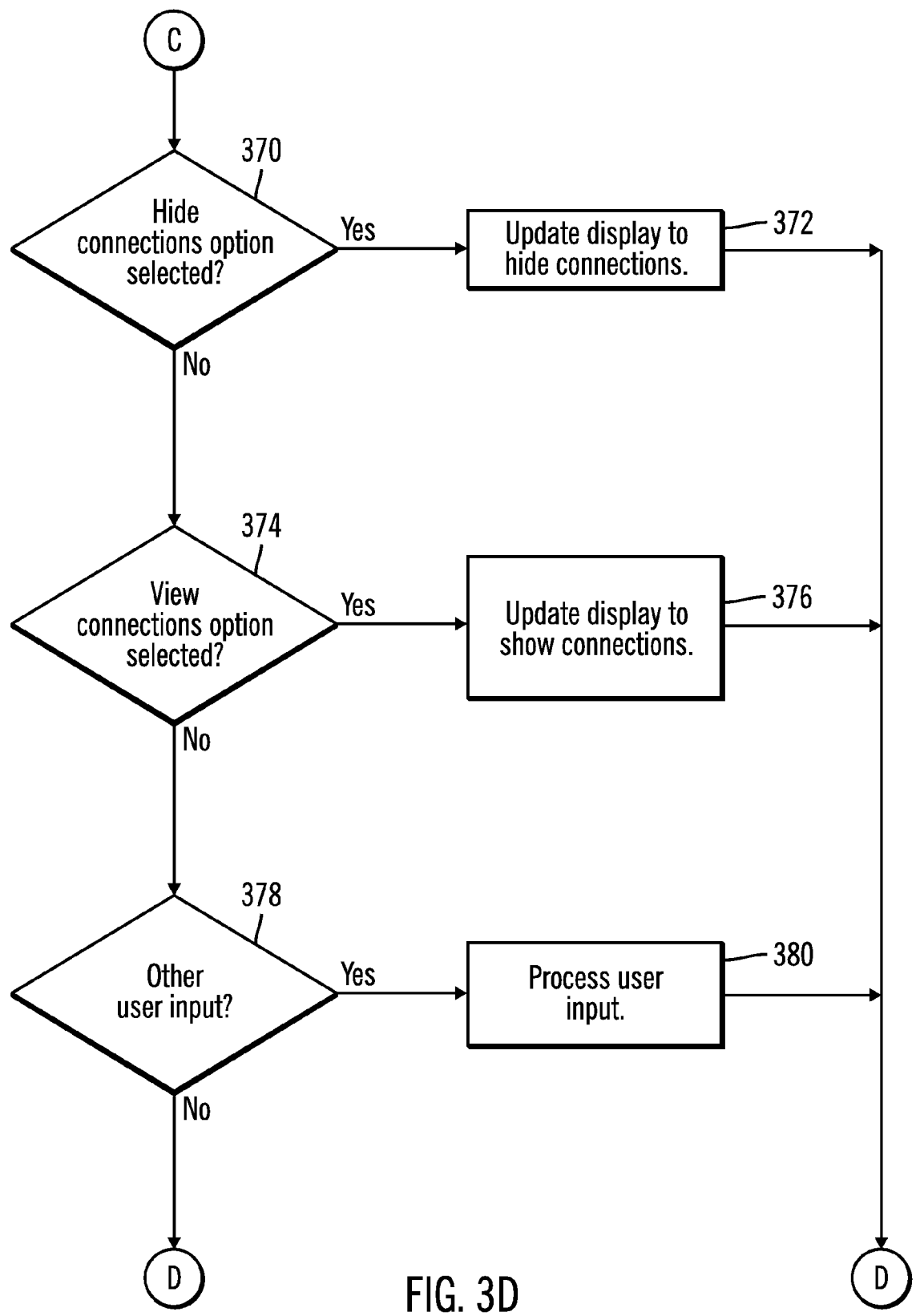

In block 366, the data lineage system 224 determines whether the user input has indicates that scroll bar input (i.e., input received when a scroll bar was moved by a user) has been received in the text view. If so, processing continues to block 368, otherwise, processing continues to block 370 (FIG. 3D). In block 368, the data lineage system 224 updates the data lineage view to show a portion of the data lineage view based on the scroll bar input. From block 368, processing continues to block 300.

In block 370, the data lineage system 224 determines whether the user input indicates that a hide connections option has been selected. Connections may be described as processes that touch the object (i.e., impact or affect the object). In certain embodiments, the connections may be represented as icons on lines between objects. Examples of connections include aggregation and truncation. If so, processing continues to block 372, otherwise, processing continues to block 374. In block 372, the data lineage system 224 updates the data lineage view to hide connections. From block 372, processing continues to block 300. In FIG. 7, the Hide Connections option 750 provided by the data lineage system 224 has been selected, and the data lineage system 224 does not display connections.

Figure 9:
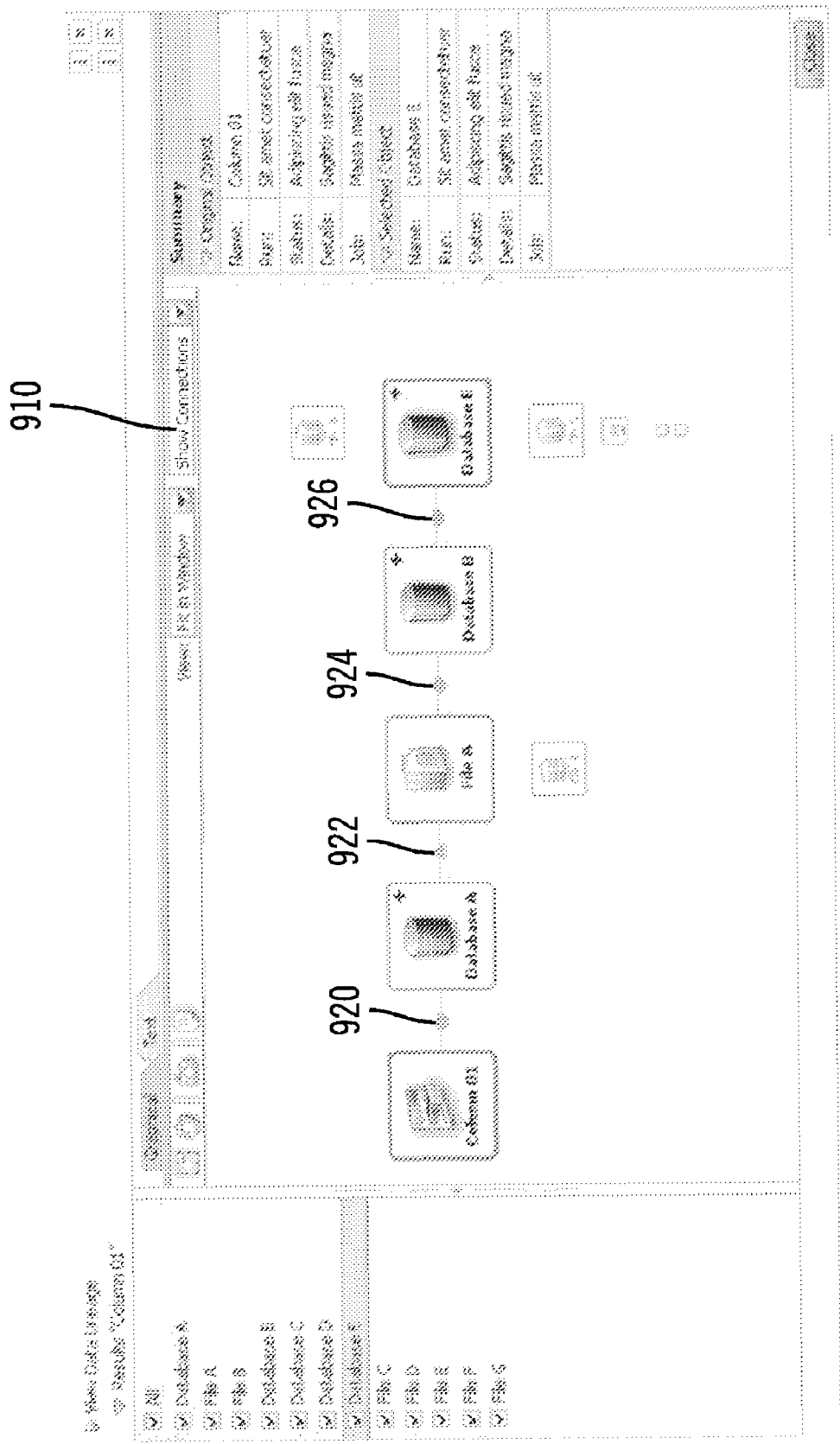
FIG. 9 illustrates connections in accordance with certain embodiments.

In block 374, the data lineage system 224 determines whether the user input indicates that a view connections option has been selected. If so, processing continues to block 376, otherwise, processing continues to block 378. In block 376, the data lineage system 224 updates the data lineage view to show connections. From block 376, processing continues to block 300. FIG. 9 illustrates connections in accordance with certain embodiments. In FIG. 9, the Show Connections option 910 provided by the data lineage system 224 has been selected. Various connections 920, 922, 924, 926 are illustrated on lines connecting objects.

In block 378 the data lineage system 224 determines whether the user input is other user input. If so, processing continues to block 380, otherwise, processing continues to block 300 (FIG. 3A). In block 380, the data lineage system 224 processes the user input. From block 380, processing continues to block 300.

Embodiments provide User Interface options for a data lineage tool that enables a user to view data lineage for objects that are in a data lineage path (i.e., descendants and/or ancestors), provides details of an original object and a selected object, and shows what happened to an object and how that object was affected by processes (truncated, aggregated).

Embodiments enable the user to visually view data lineage in a data lineage path area in which the data lineage view is displayed. This is achieved through the fish-eye view of content, which fits all content chosen from the filtering into the visible computer screen through the use of dynamically updating data lineage paths. Users may easily switch focus of the analysis by manipulating the fish-eye view. No scrolling up, down, right or left is required, and user error of trying to trace data lineage paths through a cluttered visual map of relationship data lineage paths is reduced, while comparison of data lineage paths is much easier. Embodiments also enable collapsing multiple objects selected by the user into a single container. These containers may be uncollapsed or recollapsed as desired.

Also, embodiments enable a user to view greater context of each object by providing details of any selected object and/or rolled over. This provides greater user orientation and analysis understanding.

Thus, the data lineage system 224 eases the usability of the data lineage tool by displaying clear visual data lineage paths through relationships, providing both macro (i.e., full size) and micro (i.e., fit in window) views, enabling management of data by compressing selected objects into containers with filtering, and providing several display options (full screen and fish eye) to manage the view within available computer screen real estate. The data lineage system 224 allows users to selectively focus on certain parts of the view output by a data lineage tool rather than the whole view.

ADDITIONAL EMBODIMENT DETAILS

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

Thus, a computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, and/or combinations of software and hardware.

Certain embodiments may be directed to a method for deploying computing infrastructure by a person or automated processing integrating computer-readable code into a computing system, wherein the code in combination with the computing system is enabled to perform the operations of the described embodiments.

The logic of FIGS. 3A, 3B, 3C, and 3D describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3A, 3B, 3C, and 3D may be implemented in software, hardware, programmable and non-programmable gate array logic or in some combination of hardware, software, or gate array logic.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer readable storage medium having a computer readable program when executed on a computer causes the computer to view data lineage of objects, comprising:

display a list of objects that are part of a history of an original object in a first pane of data lineage output;

receive selection of objects from the list of object;

display a data lineage view that includes at least one data lineage path in a path area of the data lineage output, wherein the data lineage view is generated by a data lineage tool that tracks the original object through processes that touched that original object, wherein the at least one data lineage path is generated from the original object to a selected object from the list of objects and indicates how the original object was affected by the processes, wherein the data lineage view includes intermediate objects selected from the list of objects, and wherein the data lineage view is displayed as a fish eye view;

display information about the objects in the data lineage view in a details area of the data lineage output;

in response to receiving selection of an object in a data lineage path, horizontally align the original object and the selected object in the data lineage path;

in response to receiving selection of an object in the data lineage view displayed as the fish eye view, enlarge a size of the selected object relative to unselected objects, while decreasing a size of one or more of the unselected objects, wherein the unselected objects do not include the original object and wherein the size of the selected object is a same size as a size of the original object; and in response to receiving selection of a second object in the data lineage view, wherein the previously selected object is a first object,
dynamically update the data lineage view to modify the objects in the at least one data lineage path based on the selection, wherein visual presentation of intermediate objects between the original object and the second object is compressed by reducing a size of the intermediate objects; and
provide details about the second object in the details area.

2. The computer readable storage medium of claim 1, wherein updating the data lineage view comprises at least one of modifying a color of the selected object to distinguish the selected object from the unselected objects, highlighting the selected object, without highlighting the unselected objects, and represented the selected object with a graphic different from a graphic used to represent the unselected objects.

3. The computer readable storage medium of claim 1, wherein the computer readable program when executed on a computer causes the computer to:
in response to receiving rollover of an object in the data lineage view displayed in a data lineage view as the fish eye view;
dynamically update the data lineage view to modify the objects in the at least one data lineage path based on the rollover; and
provide details about the rolled over object in the details area.

4. The computer readable storage medium of claim 3, wherein updating the data lineage view comprises at least one of enlarging a size of the rolled over object relative to other objects, while decreasing a size of one or more of the other objects, modifying a color of the rolled over object to distinguish the rolled over object from the other objects, highlighting the rolled over object without highlighting the other objects, and represented the rolled over object with a graphic different from a graphic used to represent the rolled over objects.

5. The computer readable storage medium of claim 1, wherein the computer readable program when executed on a computer causes the computer to:
display details of the original object and one selected object in the details area.

6. The computer readable storage medium of claim 1, wherein the computer readable program when executed on a computer causes the computer to:

in response to receiving selection of a grab tool, update the data lineage view to show a portion of the data lineage view based on user input.

7. The computer readable storage medium of claim 1, wherein the computer readable program when executed on a computer causes the computer to:
in response to receiving selection of a snapshot tool, generate a snapshot of the data lineage view.

8. The computer readable storage medium of claim 1, wherein the computer readable program when executed on a computer causes the computer to:
in response to receiving selection of a generate report tool, generate a report of the data lineage view.

9. The computer readable storage medium of claim 1, wherein the computer readable program when executed on a computer causes the computer to:
in response to receiving selection of a graphical view, display a graphical view of the data lineage view.

10. The computer readable storage medium of claim 9, wherein the computer readable program when executed on a computer causes the computer to:
in response to receiving selection of a collapse tool and one or more objects on the at least one data lineage path, collapsing the selected one or more objects into a container;
in response to receiving rollover of the container, displaying a information about content of the container; and
in response to receiving selection of an uncollapse symbol, displaying the one or more objects in the container.

11. The computer readable storage medium of claim 9, wherein the computer readable program when executed on a computer causes the computer to:
in response to receiving selection of a hide connections option, display the data lineage with connections between objects hidden; and
in response to receiving selection of a view connections option, display connections between objects in the data lineage view.

12. The computer readable storage medium of claim 9, wherein the data lineage view is displayed as the fish eye view in response to receiving selection of a fit in window option.

13. The computer readable storage medium of claim 9, wherein the computer readable program when executed on a computer causes the computer to:
in response to receiving selection of a full size option, displaying all of the one or more objects in the at least one data lineage data lineage path at one hundred percent actual zoom, wherein one or more of the objects are not on a visible in a path area displayed on a computer screen; and
in response to receiving scroll bar input, updating the data lineage view to show a portion of the data lineage view based on the scroll bar input.

14. The computer readable storage medium of claim 1, wherein the computer readable program when executed on a computer causes the computer to:
in response to receiving selection of a text view, displaying a text view of the data lineage view; and
in response to receiving scroll bar input, updating the data lineage view to show a portion of the data lineage view based on the scroll bar input.

15. A method for viewing data lineage of objects, comprising:
displaying a list of objects that are part of a history of an original object in a first pane of data lineage output;
receiving selection of objects from the list of object;

displaying a data lineage view that includes at least one data lineage path in a path area of the data lineage output, wherein the data lineage view is generated by a data lineage tool that tracks the original object through processes that touched that original object, wherein the at least one data lineage path is generated from the original object to a selected object from the list of objects and indicates how the original object was affected by the processes, wherein the data lineage view includes intermediate objects selected from the list of objects, and wherein the data lineage view is displayed as a fish eye view;

displaying information about the objects in the data lineage view in a details area of the data lineage output;

in response to receiving selection of an object in a data lineage path, horizontally aligning the original object and the selected object in the data lineage path;

in response to receiving selection of an object in the data lineage view displayed as the fish eye view, enlarging a size of the selected object relative to unselected objects, while decreasing a size of one or more of the unselected objects, wherein the unselected objects do not include the original object and wherein the size of the selected object is a same size as a size of the original object; and in response to receiving selection of a second object in the data lineage view, wherein the previously selected object is a first object,
dynamically updating the data lineage view to modify the objects in the at least one data lineage path based on the selection, wherein visual presentation of intermediate objects between the original object and the second object is compressed by reducing a size of the intermediate objects; and
providing details about the second object in the details area.

16. The method of claim 15, further comprising:
in response to receiving rollover of an object in the data lineage view displayed in a data lineage view as the fish eye view;
dynamically updating the data lineage view to modify the objects in the at least one data lineage path based on the rollover; and
providing details about the rolled over object in the details area.

17. The method of claim 16, wherein updating the data lineage view comprises at least one of enlarging a size of the rolled over object relative to other objects, while decreasing a size of one or more of the other objects, modifying a color of the rolled over object to distinguish the rolled over object from the other objects, highlighting the rolled over object without highlighting the other objects, and represented the rolled over object with a graphic different from a graphic used to represent the rolled over objects.

18. A system for viewing data lineage of objects, comprising:
a computer screen; and
logic capable of performing operations, the operations comprising:

displaying a list of objects that are part of a history of an original object in a first pane of data lineage output;
receiving selection of objects from the list of object;
displaying a data lineage view that includes at least one data lineage path in a path area of the data lineage output, wherein the data lineage view is generated by a data lineage tool that tracks the original object through processes that touched that original object, wherein the at least one data lineage path is generated from the original object to a selected object from the list of objects and indicates how the original object was affected by the processes, wherein the data lineage view includes intermediate objects selected from the list of objects, and wherein the data lineage view is displayed as a fish eye view;

displaying information about the objects in the data lineage view in a details area of the data lineage output;

in response to receiving selection of an object in a data lineage path, horizontally aligning the original object and the selected object in the data lineage path;

in response to receiving selection of an object in the data lineage view displayed as the fish eye view, enlarging a size of the selected object relative to unselected objects, while decreasing a size of one or more of the unselected objects, wherein the unselected objects do not include the original object and wherein the size of the selected object is a same size as a size of the original object; and in response to receiving selection of a second object in the data lineage view, wherein the previously selected object is a first object,
dynamically updating the data lineage view to modify the objects in the at least one data lineage path based on the selection, wherein visual presentation of intermediate objects between the original object and the second object is compressed by reducing a size of the intermediate objects; and
providing details about the second object in the details area.

19. The system of claim 18, wherein the operations further comprise:
in response to receiving rollover of an object in the data lineage view displayed in a data lineage view as the fish eye view;
dynamically updating the data lineage view to modify the objects in the at least one data lineage path based on the rollover; and
providing details about the rolled over object in the details area.

20. The system of claim 19, wherein updating the data lineage view comprises at least one of enlarging a size of the rolled over object relative to other objects, while decreasing a size of one or more of the other objects, modifying a color of the rolled over object to distinguish the rolled over object from the other objects, highlighting the rolled over object without highlighting the other objects, and represented the rolled over object with a graphic different from a graphic used to represent the rolled over objects.

* * * * *